(12) United States Patent
Fujimoto et al.

(10) Patent No.: US 8,127,322 B2
(45) Date of Patent: Feb. 28, 2012

(54) OPTICAL DISC DRIVE WITH MAIN SHAFT HAVING END PORTION OF PARTICULAR CONFIGURATION

(75) Inventors: Takayuki Fujimoto, Tsuchiura (JP); Makoto Ibe, Hitachinaka (JP); Nozomu Harada, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 900 days.

(21) Appl. No.: 12/104,719

(22) Filed: Apr. 17, 2008

(65) Prior Publication Data

US 2008/0295123 A1    Nov. 27, 2008

(30) Foreign Application Priority Data

Apr. 27, 2007  (JP) ................................. 2007-119385

(51) Int. Cl.
*G11B 33/14*    (2006.01)
*G11B 7/00*     (2006.01)
(52) U.S. Cl. .................... 720/677; 720/649; 720/678
(58) Field of Classification Search .................. 720/672, 720/674–679, 648–649, 659–661, 663–666
See application file for complete search history.

(56) References Cited

U.S. PATENT DOCUMENTS

| 5,933,408 | A  | * | 8/1999 | Park et al. ...................... 720/706 |
| 6,366,551 | B1 | * | 4/2002 | Wu ............................... 720/675 |
| 2001/0006506 | A1 | * | 7/2001 | Aoyama et al. ............... 369/255 |
| 2004/0216152 | A1 | * | 10/2004 | Ezawa et al. .................. 720/659 |
| 2005/0050569 | A1 | * | 3/2005 | Yamanaka et al. ............ 720/683 |
| 2006/0130086 | A1 | * | 6/2006 | Takahashi ..................... 720/679 |

FOREIGN PATENT DOCUMENTS

JP    2005-310192    11/2005

* cited by examiner

*Primary Examiner* — Nathan Danielsen
(74) *Attorney, Agent, or Firm* — Antonelli, Terry, Stout & Kraus, LLP.

(57) ABSTRACT

For the purpose of suppressing an increase of temperature of a laser element, in an optical disc drive, even in case when recording/reproducing at such a low double speed that almost no expectation can be made upon the effect of the convection cooling due to circulating flow of an air, which is generated by rotation of a disc, and in particular, the structure for fixing both end portions of a main shaft, which is engaged with a transfer mechanism for moving an optical pickup into the disc radial direction, through the optical pickup, between two (2) pieces of shafts for supporting the optical pickup, one of which forms the main shaft, onto connector portions to be engaged with the both end portions of the main shaft, upon a mechanical chassis, on which is mounted at least a disc rotation mechanism, etc., has structures for enlarging a contacting area defined between the both end portions of the main shaft and the connector portions or pressure plates, each building up the connector portion (for example, a comb-like configuration).

12 Claims, 13 Drawing Sheets

OPTICAL DISC DRIVE WITH MAIN SHAFT HAVING END PORTION OF PARTICULAR CONFIGURATION

BACKGROUND OF THE INVENTION

The present invention relates to an optical disc drive for recording (writing) and reproducing (reading) data from/upon an orbicular disc under the condition of rotating it, and in particular, it relates to a cooling structure for conducting multi-layer recording with stability.

An optical disc drive is a data storage device for recording data on a disc surface, as well as, for reproducing the data recorded on the disc surface, under the condition of rotating the orbicular disc, i.e., a data recording medium. An electronic part equipped with a semiconductor laser element (or a laser light source) and a laser light receiving portion, etc., to be used as a signal writing/reading means for recording/reproducing the data, is called by an optical pickup, or simple, a pickup. As a disc, being the data recording medium can be listed up the followings: for example, CD-ROM, CD-R, CD-RW, DVD-ROM, DVD-R, DVD-RW, DVD-RAM, DVD+R, DVD+RW, BD-ROM, BD-R, BD-RE, etc. And, in general, the optical disc drive is mounted on electronic equipment comprising a central processing unit (CPU) for conducting access control to the optical disc drive and also calculation operation, such as, a personal computer, etc., for example. In case where such electronic equipment is the personal computer, for example, the optical disc drive is called by a half-height optical drive when it is mounted within a desktop-type personal computer, in general, and it is called by a slim-type optical disc drive when it is mounted within a notebook-type personal computer (or a portable personal computer), in general.

At present, for the optical disc drive, it is requested to enlarging the data memory capacity, much more. For the purpose of achieving that, it is necessary to multiply the number of the disc recording layer, but not only one (1) layer, but for dealing with such the multi-layer recording, it is necessary to increase an output of the semiconductor laser element, and as a result thereof, temperature of the laser element increases abruptly. An increase of temperature of the laser element comes into a reason of reducing the lift-time of the element, and this causes lowering of quality of the optical disc drive. In particular, in case of the slim-type optical disc drive, it is smaller than the half-height type optical disc drive, in the volume of housing, and is higher in packing density thereof, and therefore the laser element is exposed in an atmosphere much higher than that.

As a countermeasure for this, for example, in Japanese Patent Laying-Open No. 2005-310192 (2005)<Patent Document 1> is proposed a method for radiating heats generated from the laser element of the optical pickup, effectively, with provision of ventilation openings on a supporting plate (i.e., a unit cover) of the optical pickup within the slim-type optical disc drive, and thereby causing a convection of air passing through the ventilation openings mentioned above, which is generated by a circulating flow of an air accompanying the disc rotation.

However, in the multi-layers recording, since it is impossible to increase the disc rotation number or speed when conducting the one-layer recording, then heat radiation or cooling of the laser element cannot be expected by the air circulating flow caused due to the disc rotation. Accordingly, in the multi-layers recording where a great increase cannot be expected on the disc rotation speed, as well as, the laser output comes to be higher than that when conducting the one-layer recording, it is impossible to dissolve such drawbacks as mentioned above, by the method disclosed in the Japanese Patent Laying-Open No. 2005-310192 (2005)<Patent Document 1>.

In this manner, in such the multi-layers recording wherein a great increase cannot be expected on the disc rotation speed, as well as, the laser output comes to be higher than that when conducting the one-layer recording, since it is impossible to expect the effect of cooling of the convection caused due to the air circulating flow generated by disc rotation, it is necessary to provide a new structure for achieving the heat radiation or cooling of the heat generated from the laser element, through heat conduction into a mechanical chassis mounting thereon the optical pickup, etc.

[Patent Document 1] Japanese Patent Laying-Open No. 2005-310192 (2005)

BRIEF SUMMARY OF THE INVENTION

An object according to the present invention is to provide an optical disc drive, for dissolving deterioration of performances thereof, i.e., reducing a life-time of the laser element due to increase of the semiconductor laser element, in particular, when conducting the multi-layers recording within the slim-type optical disc drive.

For accomplishing the object of the present invention, according to the present invention, the following are provided, as a new structure for achieving the heat radiation or cooling of the heat generated from the laser element, through heat conduction into a mechanical chassis mounting thereon the optical pickup, etc.

According to the present invention, there is provided an optical disc drive (i.e., a slim-type optical disc drive) comprising a two (2) pieces of guide shafts (or, bars), which are provided in parallel with, to support both end portions of the optical pickup, for enabling the optical pickup to move into a disc radial direction when recording/reproducing, wherein between two (2) pieces of them, both end portions of that guide bar, which engages with (or guides) it, at an end portion of the optical pickup on the side connecting with a transfer mechanism (i.e., a lead screw, which is driven by a step motor) for moving the optical pickup into the disc radial direction, are fixed onto connector portions for engaging with the both end portions of said main shaft, on a mechanical chassis, at least mounting thereon a disc rotating mechanism, such as a spindle motor for use of rotational drive of a disc, etc., and within such the structures, at least one end portion of said main shaft and at least one of said connector portions or a pressure plate building up one of said connector portions is enlarged, in an area where they contact with each other.

Also, according to the present invention, within the optical disc drive mentioned above, as such the structures for enlarging the contacting area between at least one (1) end portion of said main shaft and at least one of said connector portions or a pressure plate building up said one of the connector portions, a convex portion or a plural number of convex portions and a concave portion or a plural number of concave portions are formed to be in contact with, fitting to each other.

Also, according to the present invention, within the optical disc drive mentioned above, as such the structures for enlarging the contacting area between at least one (1) end portion of said main shaft and at least one of said connector portions or a pressure plate building up said one of the connector portions, a surface contact is applied.

And also, according to the present invention, within the optical disc drive mentioned above, as such the structures for enlarging the contacting area between at least one (1) end portion of said main shaft and at least one of said connector portions or a pressure plate building up said one of the connector portions, a cross-section configuration at portion where the one end portion of said main shaft is in contact with the one of said connector portions or said pressure plate is formed into a comb-like, a zigzag, a rectangular or a circular shape, and further a cross-section configuration at portion where the one of said connector portions or said pressure plate is in contact with the one end portion of said main shaft is formed into a comb-like shape, a zigzag, a rectangular or a semi-circular shape.

And also, according to the present invention, within the optical disc drive mentioned above, such the structures, for enlarging the contacting area between at least one (1) end portion of said main shaft and at least one of said connector portions or a pressure plate building up said one of the connector portions, is applied on both end portions of said main shaft.

And also, according to the present invention, within the optical disc drive mentioned above, such the structures for enlarging the contacting area between at least one (1) end portion of said main shaft and at least one of said connector portions or a pressure plate building up said one of the connector portions is further applied between at least one of end portions of an auxiliary shaft and at least one of connector portions where said auxiliary shaft engaged with said mechanical chassis or a pressure plate building up said one connector portion.

Also, according to the present invention, as a connector member, building up one of said connector portion, is used a material having heat conductivity, being equal to or higher than 30 W/mK or more than that.

Also, according to the present invention, as a material of a connector member, building up one of said connector portion, includes therein any one of copper, brass, iron, aluminum, zinc, magnesium, aluminum die-cast, zinc die-cast, magnesium die-cast.

And, according to the present invention, there is also provided a n electronic apparatus, mounting the optical disc drive, as described in the above thereon.

With such the structures as was mentioned above, since it is possible to engage one or both of the end portions of the main shaft for supporting the optical pickup with one or both of the connector portions provided on the mechanical chassis, upon a wide contacting area, but without gaps between them, and thereby further increasing the heat conductivity of the connector portions, then the heat generated from a semiconductor laser element of the optical pickup when recording/reproducing data, after being transmitted from a housing of the optical pickup, through an engagement portion between the optical pickup and the main shaft, due to the heat conductivity thereof, into the main shaft, conducts from the one end portion or the both end portions of the main shaft into one or both of the connector portions (including the pressure plates), due to the heat conductivity thereof, and further through the said connector portions, it is radiated into the mechanical chassis mounting thereon the optical pickup, a spindle motor for use of rotationally driving the disc, etc., due to the heat conductivity thereof.

According to the present invention, since the heat generated from the laser element can be radiated into the mechanical chassis through the main shaft, effectively, due to the heat conductivity thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Thus, according to the present invention, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more. With this, it is possible to suppress the deterioration of lifetime of the laser element by suppressing a raise-up of temperature of the laser element, and it is possible to increase the performances of the optical disc apparatus (or drive).

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Explanation will be made on the embodiments in case when applying the present invention into a slim-type optical disc drive (hereinafter, being called, "an optical disc drive"), by referring to FIGS. 1 to 25.

First Embodiment

Figure 1:
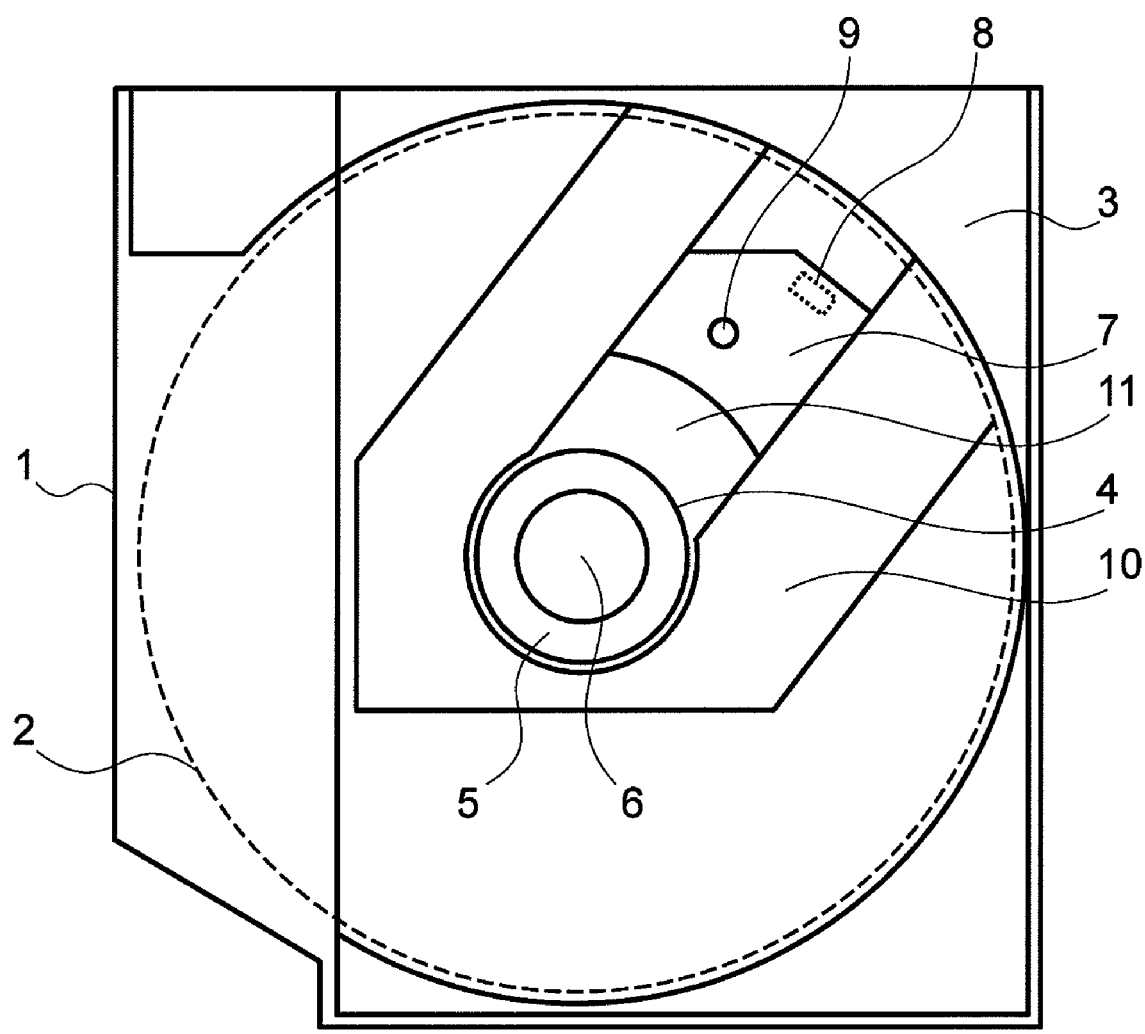
FIG. 1 is a view for showing an outlook internal structure of an optical disc drive, into which any one of $1^{st}$ to $8^{th}$ embodiments of the present invention can be applied, and in particular, a front view thereof.
Figure 2:
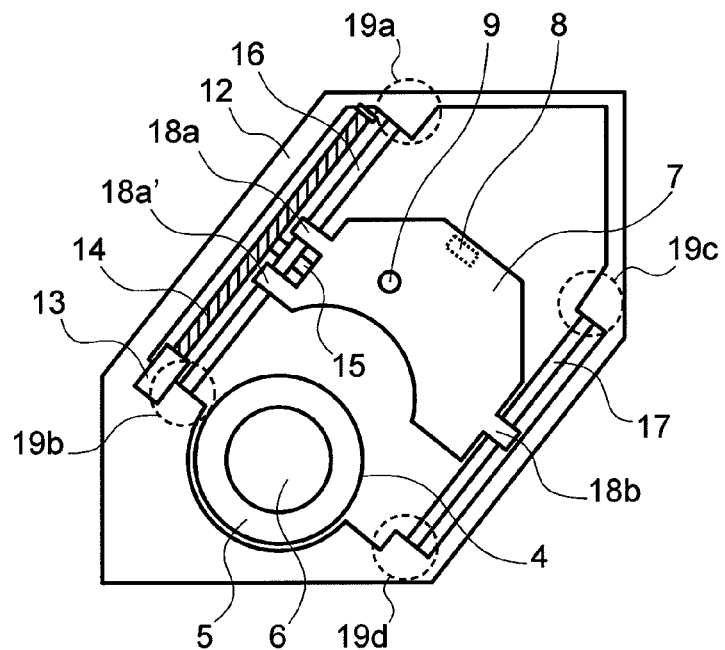
FIG. 2, is a view for showing an outlook internal structure of the optical disc drive, into which anyone of $1^{st}$ to $8^{th}$ embodiments of the present invention can be applied, and in particular, a mechanical chassis mounted within the optical disc drive.

FIG. 1 is a front view for showing an outlook internal structure of the optical disc drive, and FIG. 2 is a view for showing an outlook structure of a mechanical chassis to be mounted within the optical disc drive. In FIG. 1, while omitting a top cover of the optical disc drive from the view, a disc and a semiconductor laser element are shown by dotted lines therein.

Figure 3:
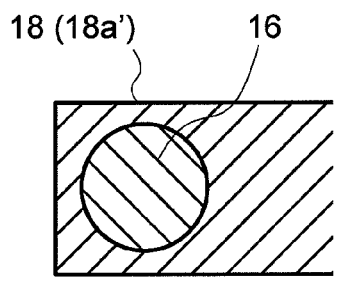
FIG. 3 is a view for showing an outlook cross-section configuration of an engagement portion between an optical pickup and a main shaft, within the optical disc drive, into which any one of $1^{st}$ to $8^{th}$ embodiments of the present invention can be applied.
Figure 4:
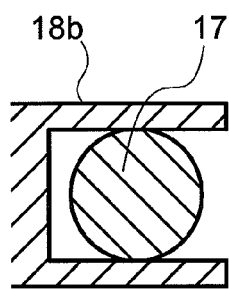
FIG. 4 is a view for showing an outlook cross-section configuration of an engagement portion between an optical pickup and a main guide shaft, within the optical disc drive, into which any one of $1^{st}$ to $8^{th}$ embodiments of the present invention can be applied.

Within a housing 1 is provided a disc tray 3 for mounting a disc 2 thereon, wherein loading or discharging of the disc 2 into/from an inside of the apparatus can be conducted, through moving the disc tray 3 on a guide (not shown in the figure), which is provided within the apparatus. When mounting the disc 2 on the disc tray 3, the disc 2 is fixed on a turntable 5 of a spindle motor 4 for use of rotationally driving the disc by means of chuck 6. And, the disc 2 is rotated by rotationally driving the spindle motor 4. Further, through driving a step motor 13, an optical pickup 7 can move in a radial direction of the disc 2 through a lead screw 14 connected with the step motor 13 and a connection member 15 connecting the lead screw 14 and the optical pickup 7. Further, the step motor 13, the lead screw 14 connected with that step motor 13, and the member 15 connecting that lead screw 14 with the optical pickup 7 build up a transfer mechanism for moving the optical pickup 7 into the disc radial direction. When moving the optical pickup 7 into the radial direction of the disc 2, the pickup 7 moves along two (2) pieces of guide bars (or shafts) 16 and 17, which provided in parallel with, engaging at both end portions 18a, 18a' and 18b. Herein, the guide bar 16 is called, a main shaft, while the guide bar 17 an auxiliary shaft, respectively. FIG. 3 shows an outlook structure on the cross-section, at a portion where the end portions 18a and 18a' of the optical pickup 7 engage with the main shaft 16, and FIG. 4 an outlook structure on the cross-section, at a portion where the end portion 18b of the optical pickup 7 engage with the auxiliary shaft 17. The structures of the end portions 18a and 18a' of the optical pickup 7 are such that, as is shown in FIG. 3, the surface of the main shaft 16 is in contact with it, on the surface thereof, equally or uniformly, on the other hand, the structure of the end portion 18b of the optical pickup 7 is such that, as is shown in FIG. 4, the auxiliary shaft 17 is in contact with it, on a line at two (2) portions, i.e., an upper portion and a lower portion thereof. Further, the main shaft 16 and the auxiliary shaft 17 are engaged with a mechanical chassis 12, mounting thereon the spindle motor 4, being the disc rotating mechanism, and the step motor 13, etc., through connector portions 19a and 19b and connector portions 19c and 19d, respectively. Also, between the optical pickup 7 and the disc 2 is provided a unit cover (a support plate) 10 having an opening portion 11, for use of supporting the optical pickup.

The laser beam oscillated from the semiconductor laser element 7, which is mounted within the optical pickup 7, is irradiated upon a recording layer of the disc 2 from an optical lens 9 passing through an optical unit, which is not shown in the figure, and thereby conducting recording of data onto the disc 2. On the other hand, when reproducing the data recorded on the disc 2, a light reflected upon the disc 2 passes through the optical unit, from the optical lens 9 thereof, and is detected upon a laser receiver portion not shown in the figure.

In this instance, since it is impossible to increase the rotation speed of the disc, greatly, and further, it is almost impossible to expect the effect of the convection cooling due to the circulating flow of air generated by the disc rotation, when conducting the multi-layers recording, wherein the laser output comes to be higher than that when conducting the one-layer recording, then there is a necessity of the structures for radiating the heats generated from the laser element 8 into the mechanical chassis 12 through heat conduction.

Then, within the first embodiment, when fixing the both end portions of the main shaft 16 on the connector portions 19a and 19b, engagement or fitting surfaces between the both end portions of the main shaft and the connector portions 19a and 19b are formed into the following configuration, which will be mentioned below.

Figure 5:
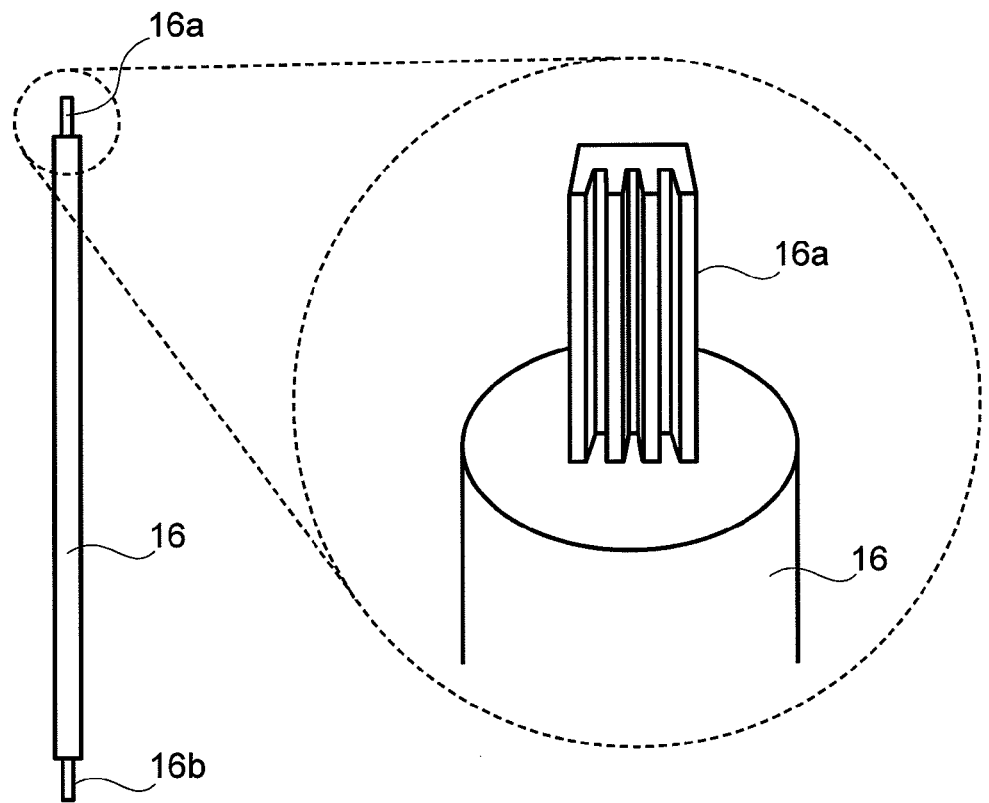
FIG. 5 is a view for showing an outlook configuration of the main guide shaft, in particular, at both ends thereof, within the optical disc drive, into which one of $1^{st}$ and $5^{th}$ embodiments of the present invention is applied.
Figure 6:
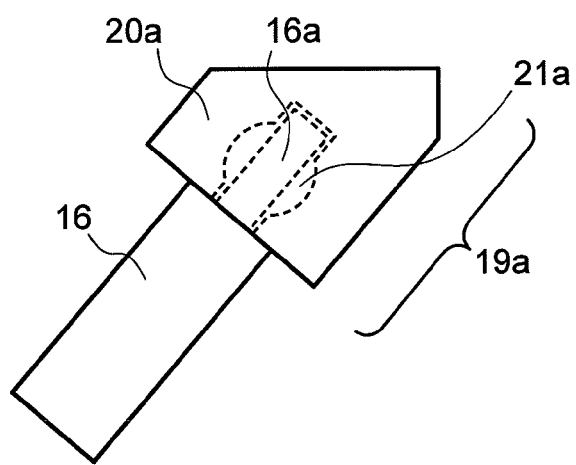
FIG. 6 is a view for showing outlook configurations of both ends of the main guide shaft and a mechanical chassis connector member, within the optical disc drive, into which any one of $1^{st}$ to $8^{th}$ embodiments of the present invention can be applied.
Figure 7:
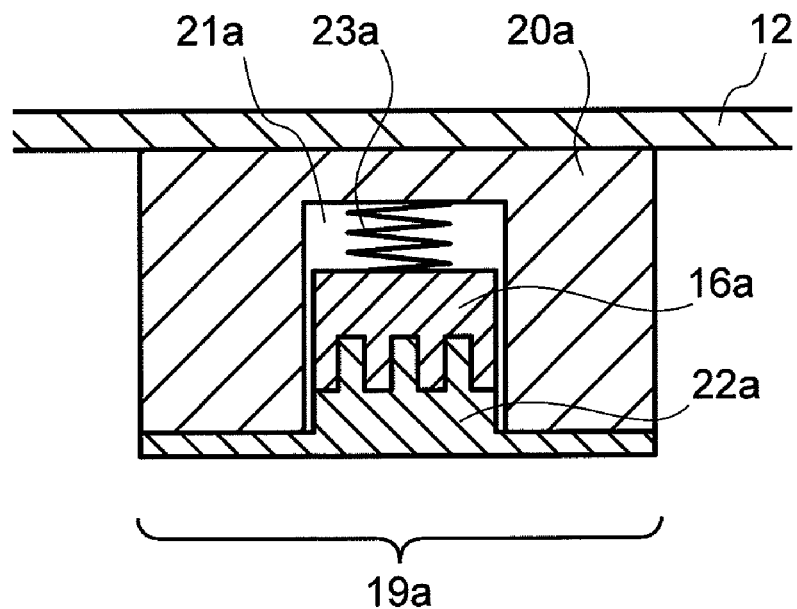
FIG. 7 is a view for showing outlook cross-section configurations of both ends of the main guide shaft and the mechanical chassis connector member, within the optical disc drive, into which the $1^{st}$ or $5^{th}$ embodiment of the present invention is applied.

First of all, as is shown in FIG. 5, the cross-section configuration of both portions 16a and 16b of the main shaft 16 are formed into comb-like shapes. Further, when fixing the both end portions 16a and 16b on the connector portions 19a and 19b, respectively, as shown in FIGS. 6 and 7, in particular, in case of the connector portion 19a, wherein the cross-section configuration of a pressure bar or plate 22a is also formed into the comb-like shape, at portion to be in contact with the end portion 16a, so as to fit with the comb-like shape of the end portion of the main shaft, within such the structures that the end portion 16a of the main shaft is pushed on the pressure plate 22a by means of a support spring 23a, which is provided in a groove portion formed within an inside of a connector member 20a. In such the fixing structure, i.e., by pushing the end portion 16a of the main shaft onto the pressure plate 22a making up the connector portion 19a, in this manner, while bringing the end portion 16a of the main shaft in contact with the pressure plate 22a, engaging or fitting a plural number of convex portions with a plural number of concave portions, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 8:
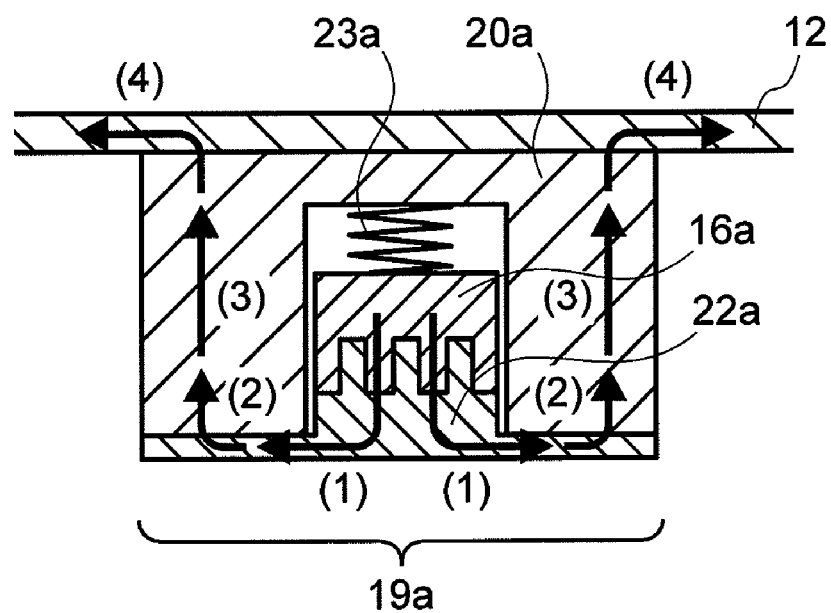
FIG. 8 is a view for showing an outlook of routes for heat radiation, in particular, in both ends of the main guide shaft and the mechanical chassis connector member, within the optical disc drive, into which the $1^{st}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 8 shows routes for heat radiations ((1) to (4)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the pressure plate 22a to the connector member 20a along with a heat radiation route (2). Next, it transmits within the connector member 20a having the high conductivity along with a heat radiation route (3), and is finally transmitted to the mechanical chassis 12 mounting thereon, the optical pickup 7, the spindle motor 4 for use of rotationally driving of disc, etc., along a heat radiation route (4). Those heat radiation routes mentioned above are also similar to those in the case of the connector portion 19b.

Further, fitting the end portion 16a of the main shaft and the pressure plate 22a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the first embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Second Embodiment

In a second embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 9:
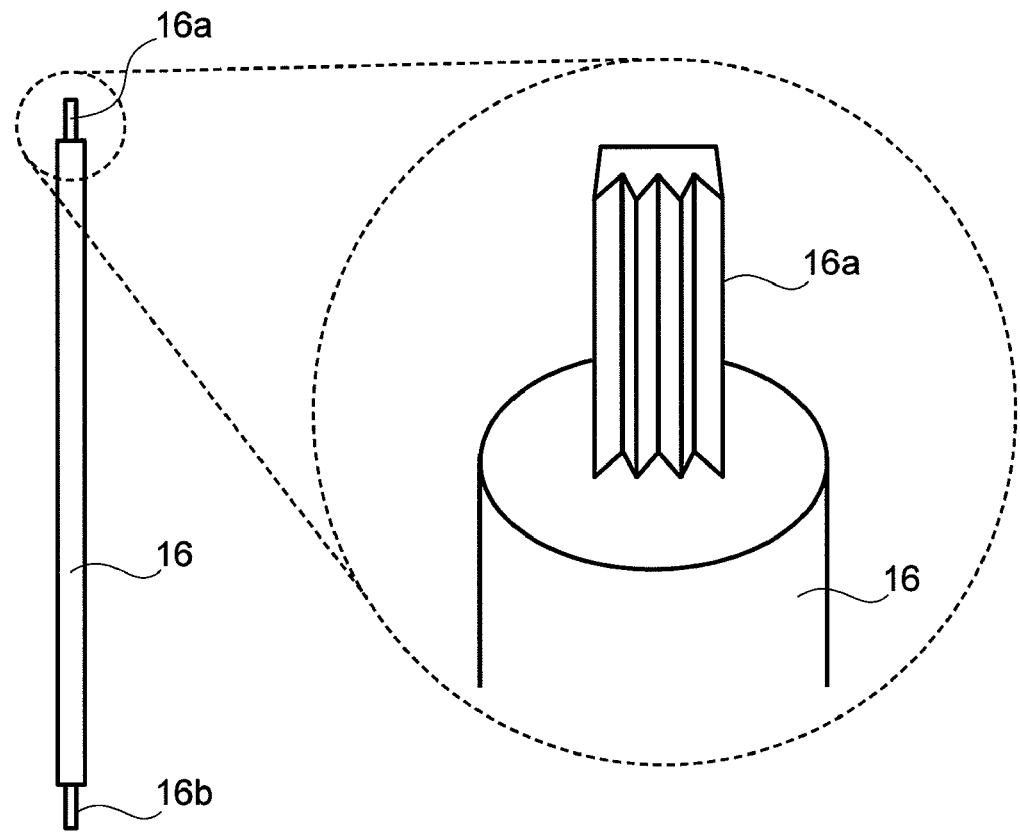
FIG. 9 is a view for showing an outlook configuration of the main guide shaft at both ends thereof, within the optical disc drive, into which one of $2^{nd}$ and $6^{th}$ embodiments of the present invention is applied.
Figure 10:
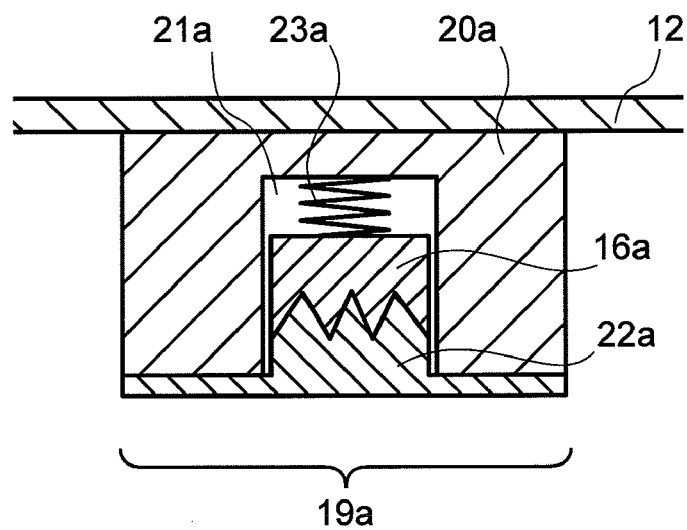
FIG. 10 is a view for showing outlook configurations of both ends of the main guide shaft and the mechanical chassis connector member, within the optical disc drive, into which the $2^{nd}$ embodiment of the present invention can be applied.

First of all, as is shown in FIG. 9, the cross-section configuration of both portions 16a and 16b of the main shaft 16 are formed into zigzag shapes. Further, when fixing the both end portions 16a and 16b on the connector portions 19a and 19b, respectively, as shown in FIG. 10, in particular, in case of the connector portion 19a, wherein the cross-section configuration of a pressure bar or plate 22a is also formed into the zigzag shape, at portion to be in contact with the end portion 16a, so as to fit with the zigzag shape of the end portion of the main shaft, within such the structures that the end portion 16a of the main shaft is pushed on the pressure plate 22a by means of a support spring 23a, which is provided in a groove portion formed within an inside of a connector member 20a. In such the fixing structure, i.e., by pushing the end portion 16a of the main shaft onto the pressure plate 22a making up the connector portion 19a, in this manner, while bringing the end portion 16a of the main shaft in contact with the pressure plate 22a, fitting a plural number of zigzag-like convex portions with a plural number of zigzag-like concave portions, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 11:
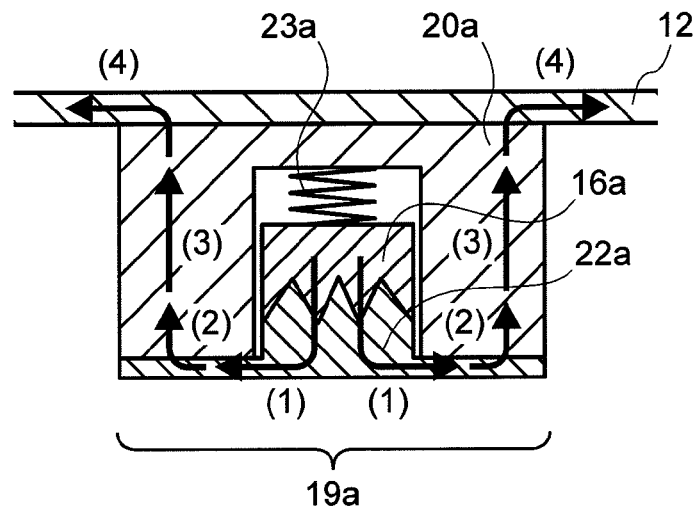
FIG. 11 is a view for showing an outlook of routes for heat radiation, in particular, in both ends of the main guide shaft and the mechanical chassis connector member, within the optical disc drive, into which the $2^{nd}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 11 shows routes for heat radiations ((1) to (4)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the pressure plate 22a to the connector member 20a along with a heat radiation route (2). Next, it transmits within the connector member 20a having the high conductivity along with a heat radiation route (3), and is finally transmitted to the mechanical chassis 12 mounting thereon, the optical pickup 7, the spindle motor 4 for use of rotationally driving of disc, etc., along a heat radiation route (4). Those heat radiation routes mentioned above are also similar to those in the case of the connector portion 19b.

Further, fitting the end portion 16a of the main shaft and the pressure plate 22a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the second embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Third Embodiment

In a third embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 12:
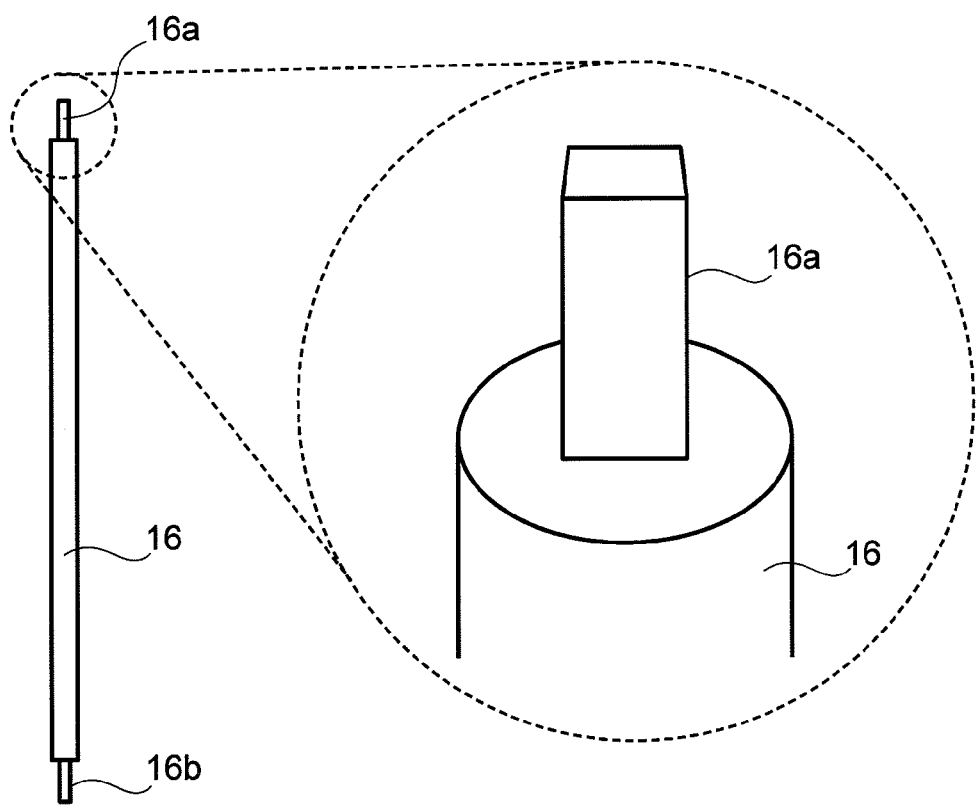
FIG. 12 is a view for showing an outlook configuration of the main guide shaft at both ends thereof, within the optical disc drive, into which one of $3^{rd}$ and $7^{th}$ embodiments of the present invention is applied.
Figure 13:
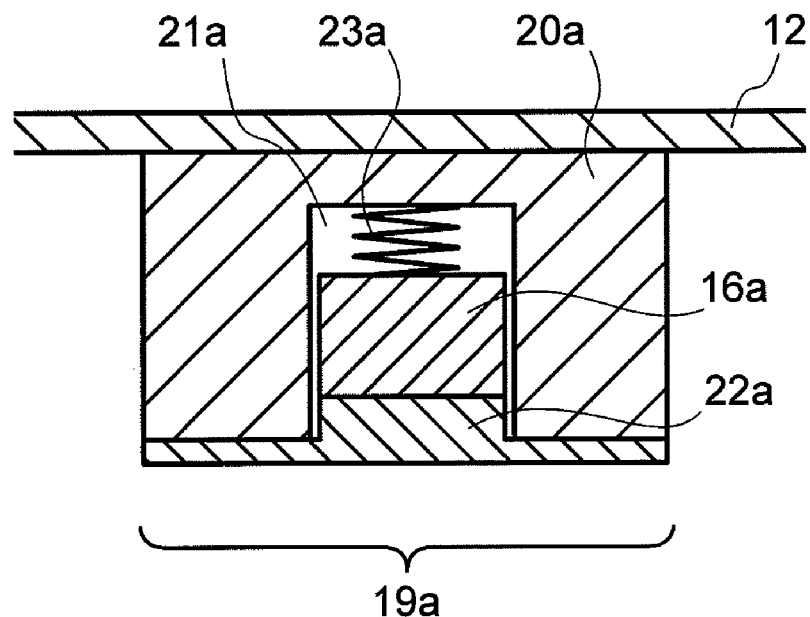
FIG. 13 is a view for showing outlook configurations of both ends of the main guide shaft and the mechanical chassis connector member, within the optical disc drive, into which the $3^{rd}$ embodiment of the present invention can be applied.

First of all, as is shown in FIG. 12, the cross-section configuration of both portions 16a and 16b of the main shaft 16 are formed into rectangular shapes. Further, when fixing the both end portions 16a and 16b on the connector portions 19a and 19b, respectively, as shown in FIG. 10, in particular, in case of the connector portion 19a, wherein the cross-section configuration of a pressure bar or plate 22a is also formed into the rectangular shape, at portion to be in contact with the end portion 16a, within such the structures that the end portion 16a of the main shaft is pushed on the pressure plate 22a by means of a support spring 23a, which is provided in a groove portion formed within an inside of a connector member 20a. In such the fixing structure, i.e., by pushing the end portion 16a of the main shaft onto the pressure plate 22a making up the connector portion 19a, in this manner, while bringing the end portion 16a of the main shaft into the surface contact with the pressure plate 22a, it is also possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 14:
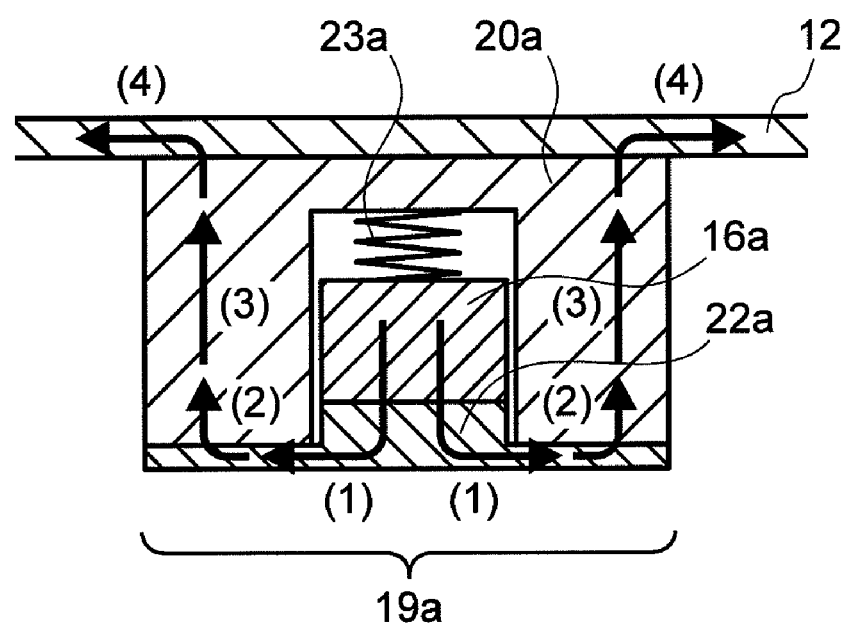
FIG. 14 is a view for showing an outlook of routes for heat radiation, in particular, in both ends of the main guide shaft and the mechanical chassis connector member, within the optical disc drive, into which the $3^{rd}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 14 shows routes for heat radiations ((1) to (4)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the pressure plate 22a to the connector member 20a along with a heat radiation route (2). Next, it transmits within the connector member 20a having the high conductivity along with a heat radiation route (3), and is finally transmitted to the mechanical chassis 12 mounting thereon, the optical pickup 7, the spindle motor 4 for use of rotationally driving of disc, etc., along a heat radiation route (4). Those heat radiation routes mentioned above are also similar to those in the case of the connector portion 19b.

As was fully explained in the above, according to the second embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Fourth Embodiment

In a fourth embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 15:
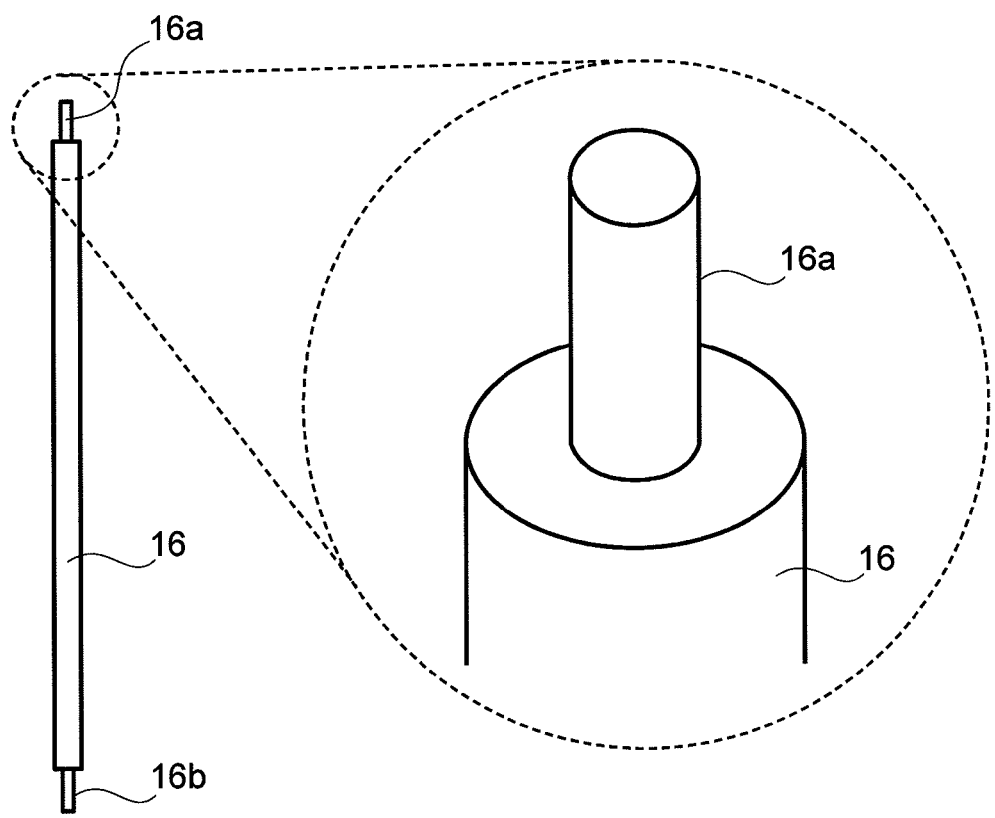
FIG. 15 is a view for showing an outlook configuration of the main guide shaft at both ends thereof, within the optical disc drive, into which one of $4^{th}$ and $8^{th}$ embodiments of the present invention is applied.
Figure 16:
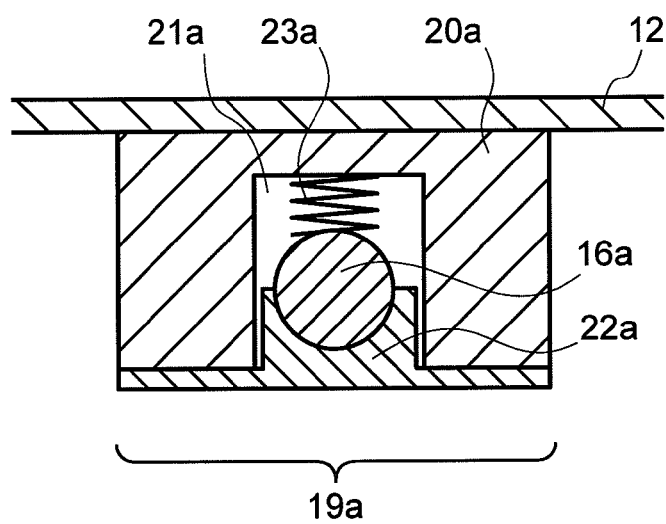
FIG. 16 is a view for showing outlook configurations of both ends of the main guide shaft and the mechanical chassis connector member, within the optical disc drive, into which the $4^{th}$ embodiment of the present invention can be applied.
Figure 17:
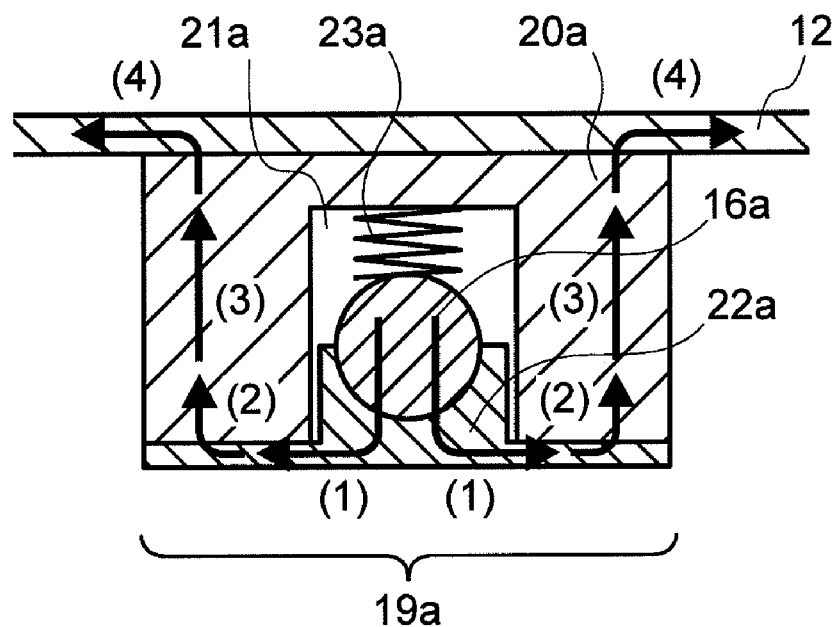
FIG. 17 is a view for showing an outlook of routes for heat radiation, in particular, in both ends of the main guide shaft and the mechanical chassis connector member, within the optical disc drive, into which the $4^{th}$ embodiment of the present invention is applied.

First of all, as is shown in FIG. 15, the cross-section configuration of both portions 16a and 16b of the main shaft 16 are formed into circular shapes. Further, when fixing the both end portions 16a and 16b on the connector portions 19a and 19b, respectively, as shown in FIG. 10, in particular, in case of the connector portion 19a, wherein the cross-section configuration of a pressure bar or plate 22a is also formed into a nearly semi-circular shape, so as to fit with the circular shape at the end portion 16a of the main shaft, at portion to be in contact with the end portion 16a, within such the structures that the end portion 16a of the main shaft is pushed on the pressure plate 22a by means of a support spring 23a, which is provided in a groove portion formed within an inside of a connector member 20a. In such the fixing structure, i.e., by pushing the end portion 16a of the main shaft onto the pressure plate 22a making up the connector portion 19a, in this manner, while bringing the end portion 16a of the main shaft into contact with the pressure plate 22a, fitting the convex portion with the concave portion thereof, it is also possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 14 shows routes for heat radiations ((1) to (4)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the pressure plate 22a to the connector member 20a along with a heat radiation route (2). Next, it transmits within the connector member 20a having the high conductivity along with a heat radiation route (3), and is finally transmitted to the mechanical chassis 12 mounting thereon, the optical pickup 7, the spindle motor 4 for use of rotationally driving of disc, etc., along a heat radiation route (4). Those heat radiation routes mentioned above are also similar to those in the case of the connector portion 19b.

Further, fitting the end portion 16a of the main shaft and the pressure plate 22a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the fourth embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Fifth Embodiment

In a fifth embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 18:
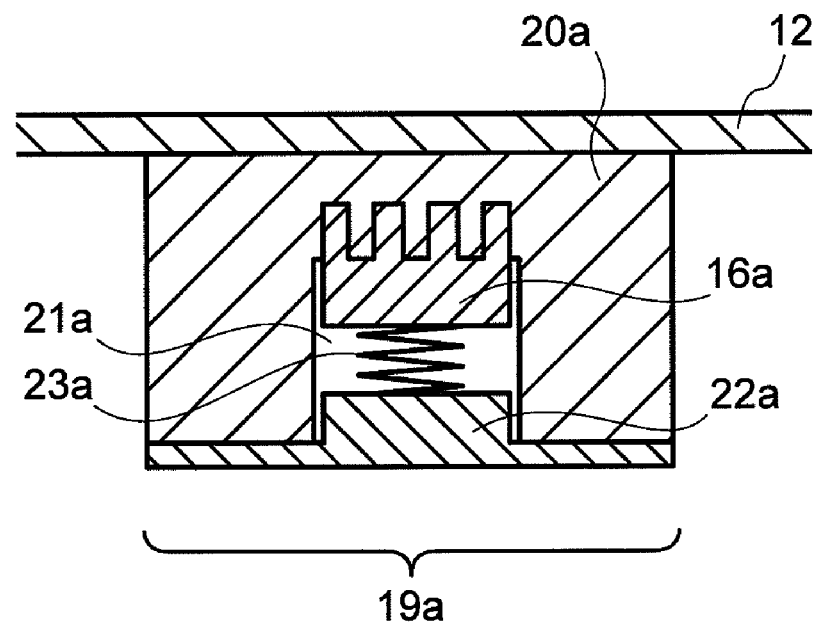
FIG. 18 is a view for showing outlook configurations of both ends of the main guide shaft and the mechanical chassis connector member, within the optical disc drive, into which the $5^{th}$ embodiment of the present invention can be applied.

First of all, as is shown in FIG. 5, the cross-section configuration of both portions 16a and 16b of the main shaft 16 are formed into comb-like shapes. Further, when fixing the both end portions 16a and 16b on the connector portions 19a and 19b, respectively, as shown in FIG. 18, in particular, in case of the connector portion 19a, wherein the cross-section configuration of a portion of an upper surface of a gutter portion 21a, which is formed within an inside of the connector member 20a, is formed into the comb-like shape, at portion where the connector member 20a should be in contact with the end portion 16a, so as to fit with the comb-like shape of the end portion of the main shaft, within such the structures of fixing the end portion 16a of the main shaft by means of the support spring 23a and the pressure plate 22a. In such the fixing structure, i.e., by fixing the end portion 16a of the main shaft by pushing it onto the connector member 20a, which builds up the connector portion 19a, in this manner, while bringing the end portion 16a of the main shaft in contact with the connector member 20a building up the connector portion 19a, fitting a plural number of convex portions with a plural number of concave portions, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 19:
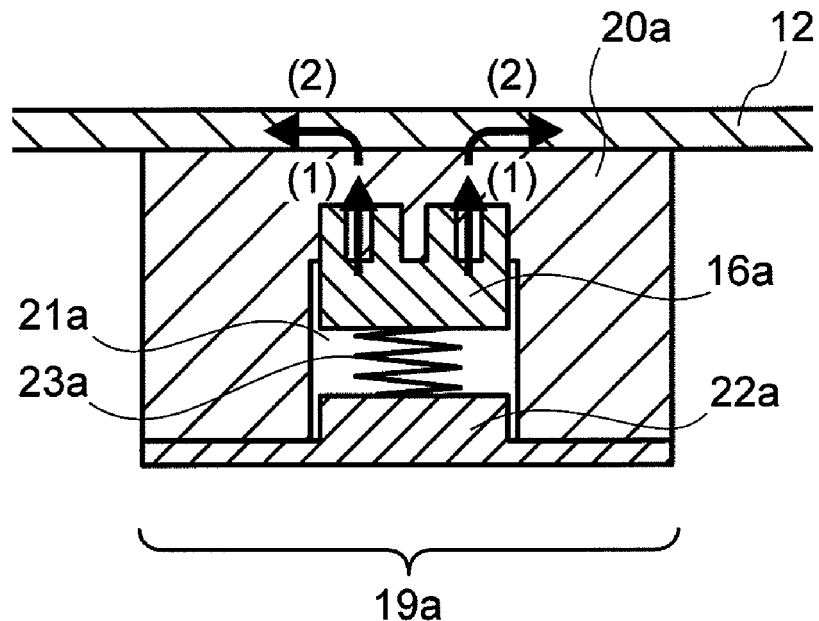
FIG. 19 is a view for showing an outlook of routes for heat radiation, in particular, in both ends of the main guide shaft and the mechanical chassis connector member, within the optical disc drive, into which the $5^{th}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 19 shows routes for heat radiations ((1) and (2)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the connector member 20a into the mechanical chassis 12 along with a heat radiation route (2). Those heat radiation routes mentioned above are also similar to those in the case of the connector portion 19b.

Further, fitting the end portion 16a of the main shaft and the connector member 20a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the first embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Sixth Embodiment

In a sixth embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 20:
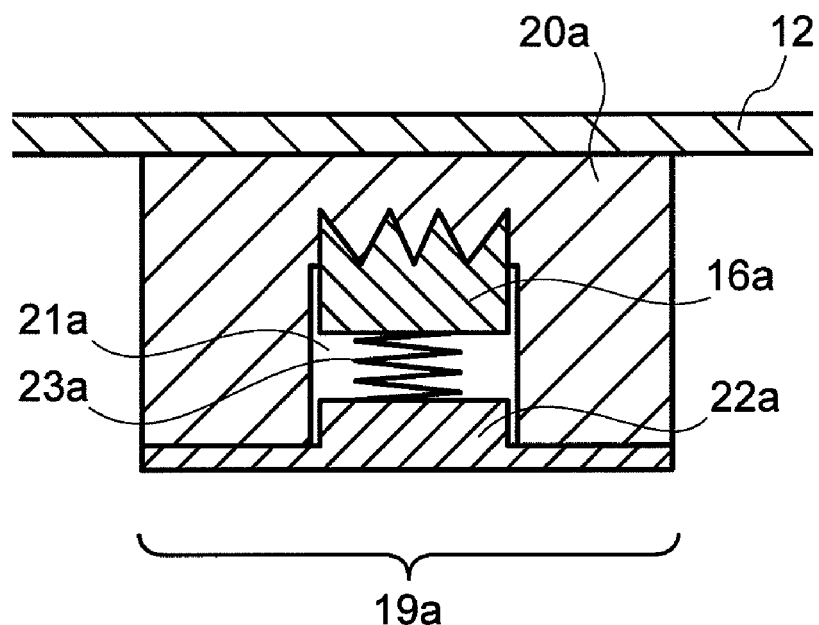
FIG. 20 is a view for showing outlook configurations of both ends of the main guide shaft and the mechanical chassis connector member, within the optical disc drive, into which the $6^{th}$ embodiment of the present invention can be applied.

First of all, as is shown in FIG. 9, the cross-section configuration of both portions 16a and 16b of the main shaft 16 are formed into zigzag shapes. Further, when fixing the both end portions 16a and 16b on the connector portions 19a and 19b, respectively, as shown in FIG. 20, in particular, in case of the connector portion 19a, wherein the cross-section configuration of a portion of an upper surface of a gutter portion 21a, which is formed within an inside of the connector member 20a, is formed into the zigzag shape, at portion where the connector member 20a should be in contact with the end portion 16a, so as to fit with the zigzag shape of the end portion 16a of the main shaft, within such the structures of fixing the end portion 16a of the main shaft by means of the support spring 23a and the pressure plate 22a. In such the fixing structure, i.e., fixing the end portion 16a of the main shaft by pushing it onto the connector member 20a, which builds up the connector portion 19a, in this manner, while bringing the end portion 16a of the main shaft in contact with the connector member 20a building up the connector portion 19a, fitting a plural number of zigzag convex portions with a plural number of zigzag concave portions, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 21:
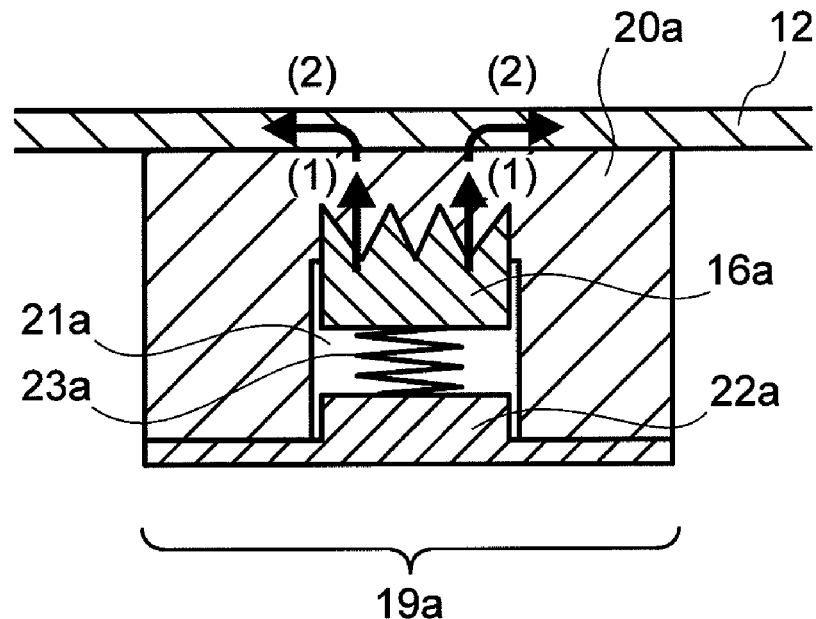
FIG. 21 is a view for showing an outlook of routes for heat radiation, in particular, in both ends of the main guide shaft and the mechanical chassis connector member, within the optical disc drive, into which the $6^{th}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 21 shows routes for heat radiations ((1) and (2)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the connector member 20a into the mechanical chassis 12 along with a heat radiation route (2). Those heat radiation routes mentioned above are also similar to those in the case of the connector portion 19b.

Further, fitting the end portion 16a of the main shaft and the connector member 20a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the sixth embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Seventh Embodiment

In a seventh embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 22:
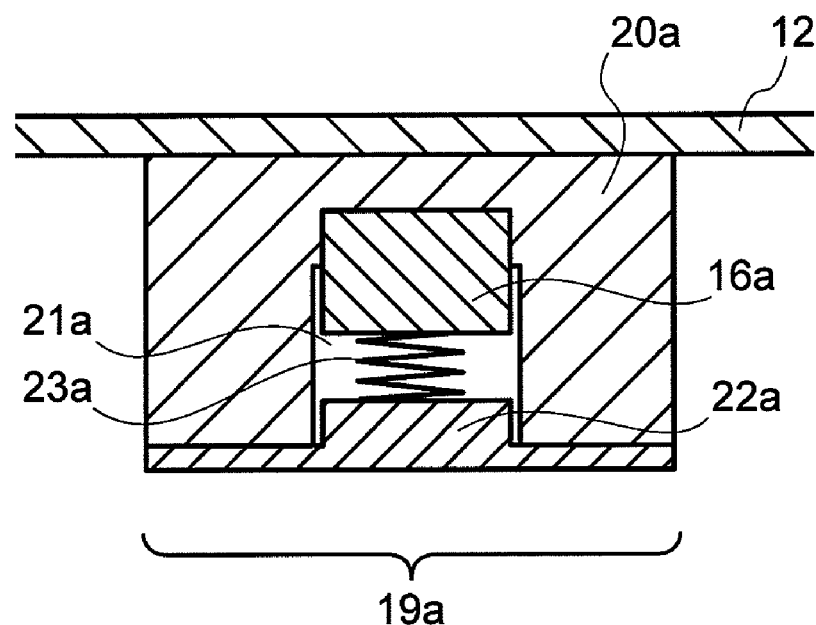
FIG. 22 is a view for showing outlook configurations of both ends of the main guide shaft and the mechanical chassis connector member, within the optical disc drive, into which the $7^{th}$ embodiment of the present invention can be applied.

First of all, as is shown in FIG. 12, the cross-section configuration of both portions 16a and 16b of the main shaft 16 are formed into rectangular shapes. Further, when fixing the both end portions 16a and 16b on the connector portions 19a and 19b, respectively, as shown in FIG. 22, in particular, in case of the connector portion 19a, wherein the cross-section configuration of a portion of an upper surface of a gutter portion 21a, which is formed within an inside of the connector member 20a, is formed into the rectangular shape, at portion where the connector member 20a should be in contact with the end portion 16a, so as to fit with the rectangular shape of the end portion 16a of the main shaft, within such the structures of fixing the end portion 16a of the main shaft by means of the support spring 23a and the pressure plate 22a. In such the fixing structure, i.e., fixing the end portion 16a of the main shaft by pushing it onto the connector member 20a, which builds up the connector portion 19a, in this manner, while bringing the end portion 16a of the main shaft in the surface contact with the connector member 20a, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 23:
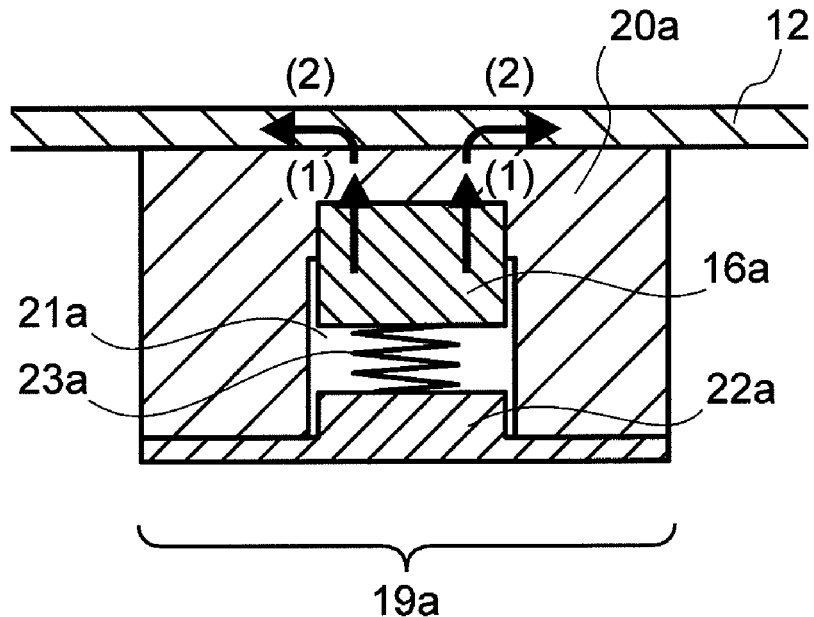
FIG. 23 is a view for showing an outlook of routes for heat radiation, in particular, in both ends of the main guide shaft and the mechanical chassis connector member, within the optical disc drive, into which the $7^{th}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 23 shows routes for heat radiations ((1) and (2)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the connector member 20a into the mechanical chassis 12 along with a heat radiation route (2). Those heat radiation routes mentioned above are also similar to those in the case of the connector portion 19b.

Further, fitting the end portion 16a of the main shaft and the connector member 20a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the seventh embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

Eighth Embodiment

In an eighth embodiment, when fixing the both end portions of the main shaft 16 on the connector portions 19a and 19b, the fitting surfaces between the both end portions of the main shaft and the connector portions 19a and 19b are formed into the following configuration, which will be mentioned below.

Figure 24:
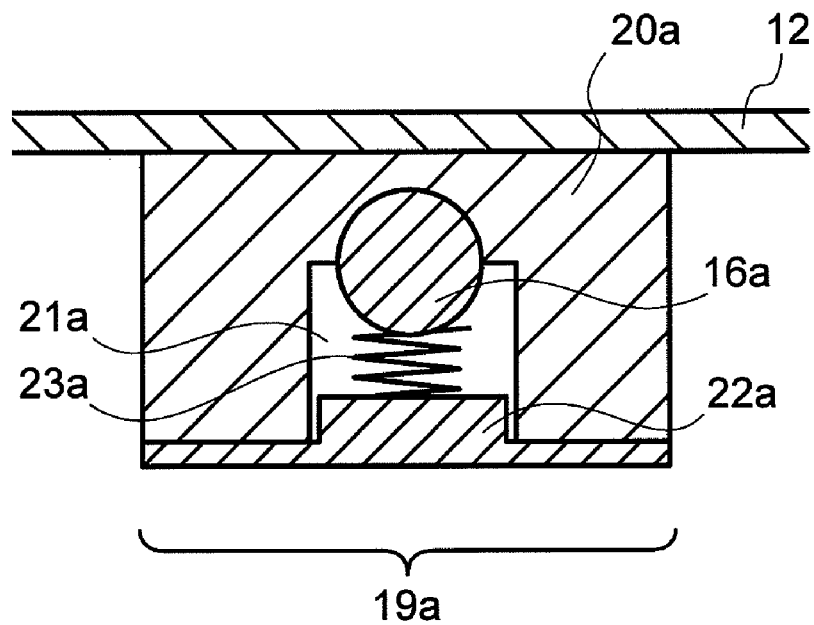
FIG. 24 is a view for showing outlook configurations of both ends of the main guide shaft and the mechanical chassis connector member, within the optical disc drive, into which the $8^{th}$ embodiment of the present invention can be applied.

First of all, as is shown in FIG. 15, the cross-section configuration of both portions 16a and 16b of the main shaft 16 are formed into circular shapes. Further, when fixing the both end portions 16a and 16b on the connector portions 19a and 19b, respectively, as shown in FIG. 24, in particular, in case of the connector portion 19a, wherein the cross-section configuration of a portion of an upper surface of a gutter portion 21a, which is formed within an inside of the connector member 20a, is formed into an about semi-circular shape, so as to fit with the circular configuration at the end portion 16a of the main shaft, at portion where the connector member 20a should be in contact with the end portion 16a, so as to fit with the zigzag shape of the end portion 16a of the main shaft, within such the structures of fixing the end portion 16a of the main shaft by means of the support spring 23a and the pressure plate 22a. In such the fixing structure, i.e., fixing the end portion 16a of the main shaft by pushing it onto the connector member 20a, which builds up the connector portion 19a, in this manner, while bringing the end portion 16a of the main shaft in contact with the connector member 20a building up the connector portion 19a, fitting the convex portion and the concave portion thereof, it is possible to enlarge a contacting area between the end portion 16a of the main shaft and the pressure plate 22a, and also to fit the end portion 16a of the main shaft and the pressure plate 22a, without defining a gap between them. Further, the connector member 20a and the pressure plate 22a, making up the connector portion 19a, are made of a material having high heat conductivity, equal to or higher than 30 W/mK or more than that. As the material having such the high heat conductivity is included any one of the followings, i.e., copper, brass, iron, aluminum, zinc, magnesium, aluminum die-cast, zinc die-cast, magnesium die-cast. However, the connector member 20a is in contact with the mechanical chassis 12 mentioned above. Such the structures as mentioned above are also same to the case of the connector portion 19b.

Figure 25:
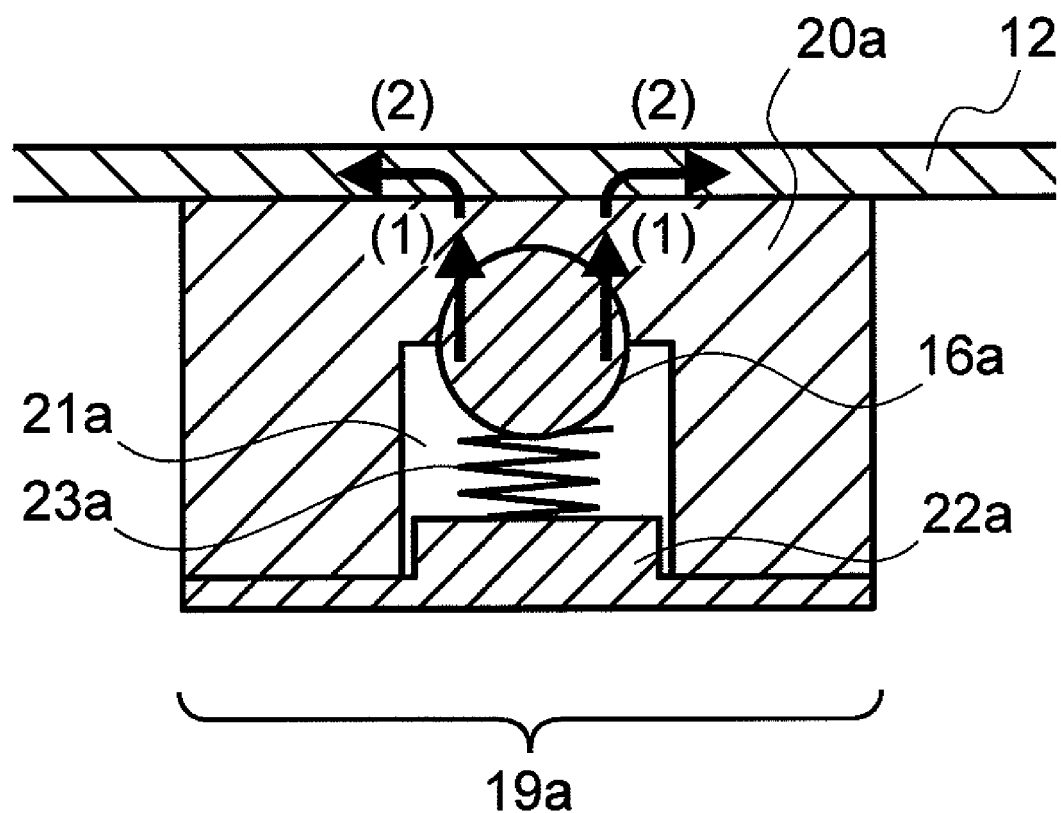
FIG. 25 is a view for showing an outlook of routes for heat radiation, in particular, in both ends of the main guide shaft and the mechanical chassis connector member, within the optical disc drive, into which the $7^{th}$ embodiment of the present invention is applied.

Applying such the structures as was mentioned therein, it is possible to radiate the heats generated from the semiconductor laser element 8 of the optical pickup 7, in particular, when recording/reproducing data, effectively, into the mechanical chassis 12, through the main shaft 16 with heat conductivity. FIG. 25 shows routes for heat radiations ((1) and (2)), briefly, due to the heat conduction at the connector portion 19a. The heat generated from the laser element 8, after transmitting from the housing of the optical pickup 7, through the engaging portions 18a and 18a' between the optical pickup 7 and the main shaft 16, into the main shaft 16, due to the heat conduction, is transmitted from the end portion 16a of the main shaft to the pressure plate 22a, due to the heat conduction, along a heat radiation route (1), and it is further transmitted from the connector member 20a into the mechanical chassis 12 along with a heat radiation route (2). Those heat radiation routes mentioned above are also similar to those in the case of the connector portion 19b.

Further, fitting the end portion 16a of the main shaft and the connector member 20a without defining the gap between them enables to suppress vibration of the main shaft 16, in particular, in the horizontal direction, when the optical pickup 7 moves into the disc radial direction along the guide bars 16 and 17, and thereby enabling recording/reproducing of data with stability.

As was fully explained in the above, according to the eighth embodiment, since the heat generated from the semiconductor laser element can be radiated into the mechanical chassis, effectively, through the main shaft due to the heat conduction thereof, it is possible to suppress an increase of temperature of the laser element, even in case when recording/reproducing at such a low double speed, that almost no expectation can be made upon the effect of the convection cooling due to the circulating flow of air, which is generated by rotation of the disc. In particular, when conducting the multi-layers recording, since it is impossible to increase the disc rotation speed, greatly, and further the laser output comes to be higher than that when conducting the one-layer recording, then the effect of the heat radiation structures, according to the present invention, can be increased much more.

With the heat radiation structure, which is applied within the embodiments, i.e., from the first embodiment to the eight embodiment, it is also possible to achieve the similar heat radiation effect within the specification for recording/reproducing other than the multi-layers recording. In particular, in Light Scribe, i.e., drawing a letter or a picture by a laser beam, on a label surface on the opposite side of the recording/ reproducing surface of the disc, since the rotation speed of the disc is very slow, such as, from several rpm to several tens rpm, for example, then it is impossible to expect the convection cooling effect due to the circulating flow of air, which is generated due to the rotation of the disc, and further the laser output becomes high, and therefore, the effect of the heat radiation structures, according to the present invention, can be increased much more.

Also, the heat radiation structure, which is applied within the embodiments, from the first embodiment to the eight embodiment, should not be limited only to the engagement or fitting surfaces between both end portions of the main shaft 16 and the connector portions 19a and 19b, but can be also applied onto the engagement or fitting surfaces between both end portions of the sub shaft 17 and the connector portions 19a and 19b. Also, it can be applied only onto the end portion on one side (i.e., one end portion) of the main shaft 16 and the sub shaft 17 and the connector portion.

Further, as the electronic equipments mounting the optical disc drive thereon, into which the present invention is applied, should not limited only to the notebook-type personal computer, but may be a computer to be mounted on a car, such as, a car navigation system, and/or a camera mounting the optical disc drive thereon.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc drive, comprising:
    an optical pickup;
    two (2) pieces of guide shafts, which are configured to support the optical pickup, when moving said optical pickup into a disc radial direction when recording/reproducing;
    a disc rotation mechanism, which is configured to rotationally drive an optical disc loaded;
    a transfer mechanism, which is configured to move said optical pickup into a disc radial direction; and
    a mechanical chassis, which is configured to mount at least said disc rotation mechanism thereon;
    wherein one of said two (2) pieces of guide shafts forms a main shaft which is engaged with said transfer mechanism through said optical pickup, and is connected with said mechanical chassis, at both ends thereof, through connector portions;
    wherein a contacting area between at least one (1) end portion of said main shaft and at least one of said connector portions and a pressure plate building up said one of the connector portions is enlarged in the structures thereof; and
    wherein a cross-section configuration at a portion where the one end portion of said main shaft is in contact with the one of said connector portions and said pressure plate is formed into a comb-like shape, and further a cross-section configuration at a portion where the one of said connector portions and said pressure plate is in contact with the one end portion of said main shaft is formed into a comb-like shape, so as to fit to each other, as such the structures for enlarging the contacting area between the at least one (1) end portion of said main shaft and the at least one of said connector portions and said pressure plate building up said one of the connector portions.

2. The optical disc drive, as described in the claim 1, wherein the structures for enlarging the contacting area between the at least one (1) end portion of said main shaft and at least one of said connector portions and said pressure plate building up said one of the connector portions is applied between the both end portions of said main shaft and the both of the one of said connector portions said pressure plates building up said connector portion.

3. The optical disc drive, as described in the claim 1, wherein the structures for enlarging the contacting area between the at least one (1) end portion of said main shaft and at the least one of said connector portions and said pressure plate building up said one of the connector portions is further applied between at least one of end portions of an auxiliary shaft and at least one of connector portions where said auxiliary shaft engaged with said mechanical chassis and said pressure plate building up said one connector portion.

4. The optical disc drive, as described in the claim 1, wherein as a connector member, building up one of said connector portion, is used a material having heat conductivity, being equal to or higher than 30 W/mK or more than that.

5. The optical disc drive, as described in the claim 1, wherein as a material of a connector member, building up one of said connector portion, includes therein any one of copper, brass, iron, aluminum, zinc, magnesium, aluminum die-cast, zinc die-cast, magnesium die-cast.

6. An electronic apparatus, comprising the optical disc drive, as described in the claim 1.

7. An optical disc drive comprising:

an optical pickup;

two (2) pieces of guide shafts, which are configured to support the optical pickup, when moving said optical pickup into a disc radial direction when recording/reproducing;

a disc rotation mechanism, which is configured to rotationally drive an optical disc loaded;

a transfer mechanism, which is configured to move said optical pickup into a disc radial direction; and a mechanical chassis, which is configured to mount at least said disc rotation mechanism thereon;

wherein one of said two (2) pieces of guide shafts forms a main shaft which is engaged with said transfer mechanism through said optical pickup, and is connected with said mechanical chassis, at both ends thereof, through connector portions;

wherein a contacting area between at least one (1) end portion of said main shaft and at least one of said connector portions and a pressure plate building up said one of the connector portions is enlarged in the structures thereof; and wherein a cross-section configuration at a portion where the one end portion of said main shaft is in contact with the one of said connector portions and said pressure plate is formed into a zigzag shape, and further a cross-section configuration at a portion where the one of said connector portions or said pressure plate is in contact with the one end portion of said main shaft is formed into a zigzag shape, to fit to the zigzag shape at the one end of said main shaft, as such the structures for enlarging the contacting area between the at least one (1) end portion of said main shaft and the at least one of said connector portions and said pressure plate building up said one of the connector portions.

8. The optical disc drive, as described in the claim 7, wherein the structures for enlarging the contacting area between the at least one (1) end portion of said main shaft and at least one of said connector portions and said pressure plate building up said one of the connector portions is applied between the both end portions of said main shaft and the both of the one of said connector portions said pressure plates building up said connector portion.

9. The optical disc drive, as described in the claim 7, wherein the structures for enlarging the contacting area between the at least one (1) end portion of said main shaft and at the least one of said connector portions and said pressure plate building up said one of the connector portions is further applied between at least one of end portions of an auxiliary shaft and at least one of connector portions where said auxiliary shaft engaged with said mechanical chassis and said pressure plate building up said one connector portion.

10. The optical disc drive, as described in the claim 7, wherein as a connector member, building up one of said connector portion, is used a material having heat conductivity, being equal to or higher than 30 W/mK or more than that.

11. The optical disc drive, as described in the claim 7, wherein as a material of a connector member, building up one of said connector portion, includes therein any one of copper, brass, iron, aluminum, zinc, magnesium, aluminum die-cast, zinc die-cast, magnesium die-cast.

12. An electronic apparatus, comprising the optical disc drive, as described in the claim 7.

* * * * *